(No Model.)
H. HENNIG.
TEA OR COFFEE STRAINER.
No. 473,626. Patented Apr. 26, 1892.
Fig. I.
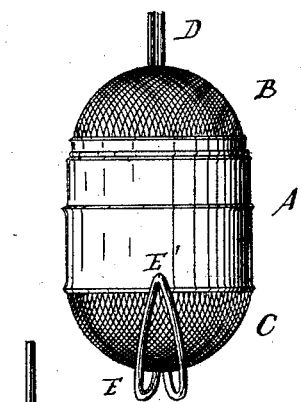
Fig. II.
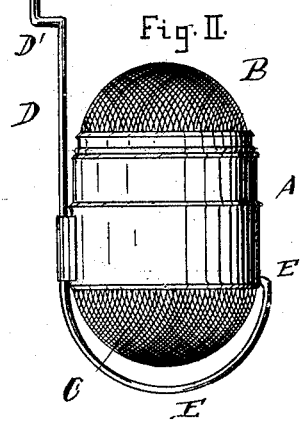
Fig. III.
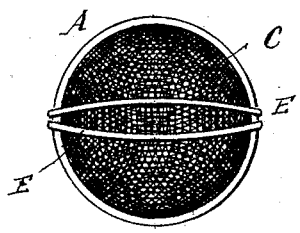
WITNESSES:
INVENTOR
H. Hennig
BY
ATTORNEYS

UNITED STATES PATENT OFFICE.

HENRY HENNIG, OF PATERSON, NEW JERSEY.

TEA OR COFFEE STRAINER.

SPECIFICATION forming part of Letters Patent No. 473,626, dated April 26, 1892.

Application filed March 14, 1891. Serial No. 385,030. (No model.)

*To all whom it may concern:*

Be it known that I, HENRY HENNIG, a citizen of the United States, and a resident of Paterson, in the county of Passaic, State of New Jersey, have invented certain new and useful Improvements in Tea or Coffee Strainers, of which the following is a specification.

This invention relates to that class of tea and coffee strainers that are adapted to receive the tea or coffee and with the same to be placed into the tea or coffee pot to permit the boiling water to extract the aromatic, coloring, and other extracts from the tea or coffee.

The object of my invention is to provide a strainer of this kind which is so constructed that the bottom apertured head of the same cannot become battered or indented.

The invention consists in a cylindrical or like receptacle adapted to receive the tea or coffee and provided with a bottom semi-spherical screen or sieve head and with guard-wires extending across said head to protect the same.

In the accompanying drawings, Figure 1 is a front view of my improved tea or coffee strainer, parts of the handle-wire being broken off. Fig. 2 is a side view of the same, parts of the handle-wire being broken off; and Fig. 3 is a bottom view of the same.

Similar letters of reference indicate corresponding parts.

The cylindrical receptacle A is provided with the semi-spherical top and bottom heads B and C, both made of wire-netting or perforated material in the usual manner.

The handle-wire D is secured to the receptacle A and is provided a greater or less distance above the receptacle with the bend or shoulder D', which can be rested on the upper edge of the pot to hold the strainer in raised position to permit all the coffee or tea extract to drip from the strainer. Said handle-wire is composed of two strands, which are carried on curved lines across or under the bottom screen-head C a short distance from the same, as shown at E, to form a guard for said bottom head. The ends of said wires are attached to the receptacle at E'. The wires converge from the center of the guard toward the ends of the same, so as to afford the greatest amount of protection of the bottom head where it is most needed—namely, at the center of said head. In case the screen is dropped upon the bottom of the pot the guard-wires E protect the bottom head and prevent the same from being battered and indented, and when the strainer rests upon the bottom of the pot the guard holds the bottom head of the strainer a short distance above the bottom of the pot, so as to permit the boiling water to readily circulate through the strainer and the contents thereof.

The receptacle is made of two telescoping sections.

Having thus described my invention, I claim as new and desire to secure by Letters Patent—

The combination, with a receptacle for tea or coffee, of a bottom hemispherical screen-head on the same and a handle-wire secured to said receptacle, and a curved guard-wire extending under said bottom head a short distance from the same, so as to form a guard which will come in contact with the bottom of the pot before the screen-head can be pressed or indented, said guard and handle-wire being made integral, substantially as set forth.

In testimony that I claim the foregoing as my invention I have signed my name in presence of two subscribing witnesses.

HENRY HENNIG.

Witnesses.
OSCAR F. GUNZ,
CHARLES SCHROEDER.